March 21, 1967  M. P. BENNETT ETAL  3,310,388
METHOD OF JOINING ALUMINUM AND A DISSIMILAR METAL
AND JOINT FORMED BY SUCH METHOD
Filed Dec. 23, 1963
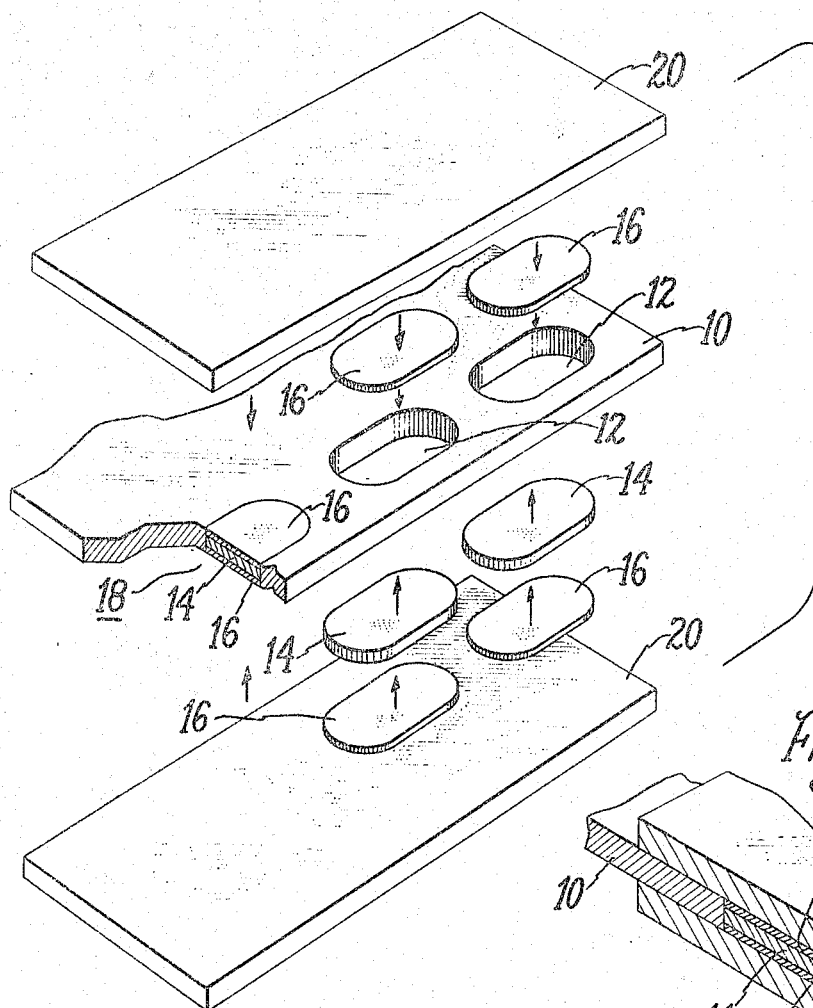
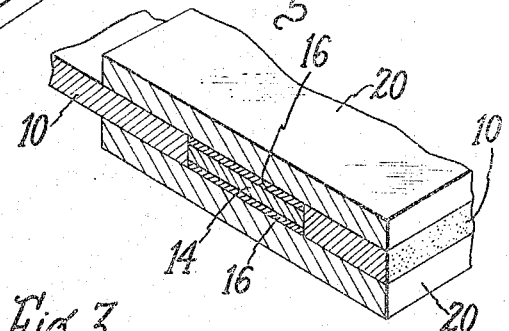
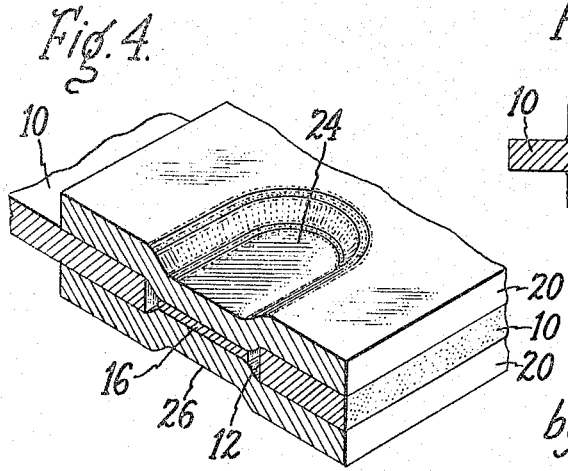
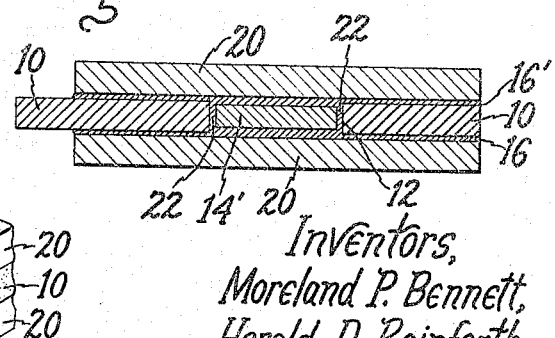
Inventors,
Moreland P. Bennett,
Harold D. Rainforth,
by Francis K. Doyle
Their Attorney.

United States Patent Office 3,310,388
Patented Mar. 21, 1967

3,310,388
METHOD OF JOINING ALUMINUM AND A DISSIMILAR METAL AND JOINT FORMED BY SUCH METHOD
Moreland P. Bennett, Pittsfield, and Harold D. Rainforth, Richmond, Mass., assignors to General Electric Company, a corporation of New York
Filed Dec. 23, 1963, Ser. No. 332,353
8 Claims. (Cl. 29—197)

This invention relates to the joining of aluminum to a dissimilar metal and more particularly to a method of joining aluminum and a dissimilar metal and to the joint formed by such method.

The problems inherent in forming a joint between aluminum and a dissimilar metal, such as copper, are well known to those skilled in the art. Dissimilar metals, for example copper, do not form good eutectic bonds with aluminum. The joints usually formed are unsatisfactory, particularly for electrical applications since such joints have high electrical resistance. Further, in most prior methods the joints so formed have been marked by very weak mechanical properties.

It has recently been disclosed in Patent No. 2,790,656 that aluminum can be welded to dissimilar metal if the dissimilar metal is first provided with a coating or facing of a silver metal. Then, a weld may be made between the facing and the aluminum, using an aluminum welding material. This type joint between aluminum and a dissimilar metal has proved satisfactory both from an electrical and mechanical standpoint. However, this method of joining aluminum and a dissimilar metal is very time consuming and expensive and does not lend itself to production line techniques.

Recently in the electrical apparatus field the use of aluminum strip winding to form coils has become widely used throughout the industry. This has led to a requirement for finding a more advantageous way of joining aluminum to dissimilar metals. This has become necessary due to the use of leads and cross-overs of dissimilar metal that are considered desirable when using aluminum strip windings.

It has been discovered that a low resistance, high mechanical strength bond can be made between aluminum and a dissimilar metal by using a silver alloy brazing material with apertures in the aluminum material and the dissimilar metal on opposite sides of the aluminum material. There is no need for welding the joint, a brazing heat being sufficient to form the desired bond.

Therefore, it is one object of this invention to provide a novel method of joining aluminum to a dissimilar metal.

Another object of this invention is to provide a novel joint between aluminum and a dissimilar metal.

A further object of this invention is to provide a novel joint between aluminum and a dissimilar metal comprising aluminum sandwiched between portions of dissimilar metal.

A still further object of this invention is to provide a novel joint between aluminum and a dissimilar metal without use of welding.

A still further object of this invention is to provide a novel joint between aluminum and a dissimilar metal by maens of brazing.

A still further object of the invention is to provide a novel braze joint between aluminum and a dissimilar metal.

Still another object of the invention is to provide a novel braze joint between aluminum and a dissimilar metal wherein the joint has excellent electrical characteristics and high mechanical strength.

Briefly, in one form, this invention comprises a method of joining aluminum and a dissimilar metal in which apertures are provided in the aluminum and a sandwich structure is formed of the aluminum with a silver brazing alloy at least in the apertures of the aluminum and the dissimilar metal above and below the aluminum. The sandwich structure is then heated until the brazing alloy melts. When cooled, a low resistance, high mechanical strength bond is formed between the aluminum and the dissimilar metal. The invention also comprises the joint made by this method.

The invention which it is desired to be protected will be particularly pointed out and distinctly claimed in the claims appended hereto. However, it is believed that this invention and the manner in which its various objects and advantages are obtained, as well as other objects and advantages thereof, will be better understood by reference to the following detailed description of preferred embodiments thereof, especially when considered in the light of the accompanying drawing, in which:

FIGURE 1 is a perspective view of one form of sandwich structure which may be used in carrying out this invention;

FIGURE 2 is a sectional view of a joint made between aluminum and a dissimilar metal according to the sandwich structure of FIG. 1;

FIGURE 3 is a sectional view of a joint made between aluminum and a dissimilar metal according to another form of the invention; and FIGURE 4 is a sectional view of a joint made between aluminum and a dissimilar metal according to still another form of the invention.

As hereinbefore mentioned, it has been discovered that a good, low resistance high mechanical strength bond can be formed between aluminum and a dissimilar metal by use of a brazing technique, wherein slots or apertures are cut into the aluminum material, and a sandwich structure is formed which comprises the aluminum material with a silver brazing alloy placed at least in the apertures of the aluminum material, and the dissimilar metal placed above and below the aluminum material. Brazing heat is then applied to this sandwich structure and when the brazing alloy melts it forms a bond with the dissimilar metal. Also, due to the brazing heat, which is generally higher than the melting temperature of aluminum the aluminum will melt and become alloyed with the brazing material forming a brazed aluminum alloy, thereby providing a good, mechanical and electrical bond between the aluminum and the dissimilar metal.

In some instances it has been found desirable to place pieces of dissimilar metal within the apertures of the aluminum material prior to forming of the structure. In such instances, when heat is applied to the sandwich structure the brazing alloy will flow about the inserts of dissimilar metal forming a bond with such dissimilar metal, and the aluminum will also flow about the metal inserts forming an alloy with the braze material to provide an even stronger bond between the aluminum and the dissimilar metal. As will be apparent, the electrical characteristics are equally as good in either case. Another method which has been discovered is in use of the brazing technique. The brazing electrodes can be provided, sized according to the apertures formed within the aluminum material, and when applied to the sandwich structure above and below the apertures in the aluminum material pressure applied to the dissimilar metal will cause indentations to form in the dissimilar metal, filling in portions of the apertures within the aluminum material, thereby providing a strong bond through the apertures with the brazing material and, at the same time, a bond is formed between the brazing material and the aluminum thereby strongly bonding the entire sandwich structure together. If desired, the dissimilar metal can be provided with indentations, similar to the apertures, prior to assembling the sandwiched structure. Of course, where the dissimilar metal is relatively thick, it will be necessary to provide the indentations prior to assembly. This is referred to as pre-embossing the dissimilar metal.

Any number of commercially available silver brazing alloys may be used in the practice of this invention. It is preferred that the brazing alloy used be one that has a melting or brazing temperature similar to the melting temperature of the aluminum. If the brazing temperature of the brazing alloy is too high there is a possibility of excess melting of the aluminum. One brazing alloy which has been used very successfully in this invention is a commercially available alloy having a composition of 15% silver, 80% copper and 5% phosphorus. One advantage of this brazing alloy is that there is no need to use a flux during the brazing operation. This brazing alloy has a melting or brazing temperature of 1300° F.

Referring now to the drawings, in which like numerals are used to indicate like parts throughout the various views thereof, there is shown, particularly in FIG. 1, one technique of forming a desired sandwich structure for obtaining a good electrical and mechanical bond between aluminum and a dissimilar metal. Considering FIG. 1, there is shown an aluminum metal piece 10 which has a plurality of apertures 12 formed therein. A number of inserts of dissimilar metal, such as for example copper, are formed as shown at 14, the inserts being substantially the size of the apertures. Also, brazing material is provided formed into the same size and shape as the dissimilar metal inserts 14, as is indicated by the brazing material inserts 16. These inserts are provided above and below the dissimilar metal insert 14, in the manner shown in FIG. 1. The inserts are formed into a sandwich structure such as is indicated at 18 in FIG. 1 where it can be seen that the central portion of the sandwich is formed of the dissimilar metal 14, while the upper and lower portions are formed of the brazing insert 16. Finally, portions of dissimilar metal, indicated at 20, are placed above and below the aluminum material 10 forming a sandwich structure such as is indicated, for example, in FIG. 2 of the drawings.

As can be seen more particularly from FIG. 2 of the drawing, a sandwich structure is provided which comprises on the lower portion of the structure the strip of dissimilar metal 20. In the center of the sandwich structure is the aluminum material 10 and within the aperture of the aluminum material 10 is the brazing material 16, then the dissimilar metal insert 14 and above that a second insert of brazing material 16, then on the top of the sandwich structure is the second portion of dissimilar metal 20. When brazing heat is applied to the sandwich structure shown in FIG. 2, the brazing material 16 will melt and flow about the insert 14 forming a bond with the dissimilar metal 20. Also, since the heat to melt the brazing alloy 16 is preferably slightly above the melting temperature of aluminum the aluminum surrounding the aperture will melt and become alloyed with the braze 16 forming a brazed aluminum structure. Thus, a bond is formed between the braze alloy 16 and the aluminum 10 and a further bond between the braze alloy 16 and the dissimilar metal 20 and the insert 14. In this manner, as will be understood, a very strong structure is provided giving excellent mechanical strength and also providing very low electrical resistance through the joint between the aluminum and the dissimilar metal. When forming the sandwich structure of FIG. 1 and FIG. 2, it is normally best merely to apply the brazing heat in the area of the apertures since this will provide the desired melting of the brazing alloy and will prevent unnecessary melting of the aluminum strip material 10.

In many instances it is desirable to provide brazing alloy throughout the entire portions of the sandwich structure between the aluminum material 10 and the dissimilar metal 20, for example, in the manner shown in FIG. 3 of the drawing. In FIG 3 there is seen the aluminum material 10 in the center of the sandwich structure, the portions of the dissimilar metal 20 on the top and bottom of the sandwich structure and brazing alloy 16' entirely between the mating areas of the dissimilar metal 20 and the aluminum material 10. Additionally, an insert 14' of dissimilar metal is provided in the slot or aperture 12 in the aluminum material 10. FIGURE 3 is actually a showing of the joint formed between the dissimilar metal 20 and aluminum material 10 after brazing heat has been applied. The brazing alloy 16' flows about the dissimilar insert 14' in the manner shown at 22. Actually, the material 22 is a combination of brazing alloy, and of a braze and aluminum alloy, and a braze and copper alloy. Thus it is seen that portions 22 specifically bond to the aluminum 10 around the aperture 12 and are also bonded to the dissimilar metal insert 14'. In a similar fashion the brazing alloy 16' contains a bond formed with the aluminum which is actually an alloy of the braze and the aluminum and also forms a brazing bond to the dissimilar metals 20 on the top and bottom of the sandwich structure. From this it will be apparent that by use of the brazing material throughout the entire portion of the mating surfaces of the aluminum and the dissimilar metal a strong bond is provided which is stronger than the bond provided merely using the brazing material on the apertures of the aluminum only. Of course, as will be understood, the joint formed between the aluminum 10 and the dissimilar metal 20 has excellent electrical characteristics.

Referring now to FIG. 4 of the drawing, there is shown another embodiment of the invention in which a sandwich structure is provided of the aluminum material 10 between two members 20 of dissimilar metal. An aperture 12 is formed in the aluminum material 10 and an insert 16 of brazing material is placed within the aperture prior to the assembly of the sandwich. After the material has been assembled in the sandwich structure shown in FIG. 4, a brazing tool is used and concentrated above and below the aperture 12 and pressure applied to the brazing tool in combination with the brazing heat forms the indentations 24 and 26 in the dissimilar metal 20. At the same time the brazing heat will cause the brazing alloy 16 to melt forming a brazing bond with the dissimilar metal 20 and also forming a braze aluminum alloy along the sides of the aperture 12. From this it will be apparent that there is also provided a very strong mechanical bond between the dissimilar metals 20 and the aluminum 10 by use of the simple, single insert of brazing alloy and using indentations as provided in FIG. 4. As earlier noted, in some instances it may be necessary or at least desirable to pre-emboss the dissimilar metal 20 with indentations 24 and 26.

From the above description of the various embodiments of this invention it will be apparent to those skilled in the art that by means of this invention a strong mechanical and low resistance electrical bond is provided between aluminum and dissimilar metals. While various embodiments have been set forth in the description of this invention, it will of course be apparent to those skilled in the art that various changes may be made in the embodiments shown without departing from the spirit and scope of the invention, especially as set forth in the appended claims.

What is claimed as new and which it is desired to be secured by Letters Patent of the United States is:

1. A method of joining aluminum and a dissimilar metal comprising the steps of forming apertures in the aluminum to be joined, then forming a sandwich structure of the aluminum with a silver brazing alloy at least in the apertures of the aluminum and a dissimilar metal above and below the aluminum, heating the sandwich structure until the brazing alloy melts, then cooling to provide a desired low resistance, high mechanical strength bond.

2. A method of joining aluminum and a dissimilar metal comprising the steps of forming apertures in the aluminum to be joined, placing inserts of a silver brazing alloy in said apertures, then forming a sandwich structure of the aluminum with the silver brazing alloy in the apertures and a dissimilar metal above and below the aluminum, heating the sandwich structure only in the area of said apertures until the brazing alloy melts, then cooling to provide a desired low resistance, high mechanical strength bond.

3. A method of joining aluminum and a dissimilar metal comprising the steps of forming apertures in the aluminum to be joined, then forming a sandwich structure of the aluminum with a silver brazing alloy at least in the apertures of the aluminum and a dissimilar metal above and below the aluminum, applying heat and pressure to the dissimilar metal above and below said apertures forming indentations in said dissimilar metal and heating the sandwich structure until the brazing alloy melts, then cooling to provide a desired low resistance, high mechanical strength bond.

4. A method of joining aluminum and a dissimilar metal comprising the steps of forming apertures in the aluminum to be joined, placing inserts of silver brazing alloy in said apertures, forming indentations of substantially the same size as said apertures in portions of dissimilar metal, then forming a sandwich structure of the aluminum with the silver brazing alloy in the apertures and the dissimilar metal above and below the aluminum with said indentations registering with said apertures, heating the sandwich structure until the brazing alloy melts, then cooling to provide a desired low resistance, high mechanical strength bond.

5. A method of joining aluminum with a dissimilar metal comprising the steps of providing apertures in the aluminum to be joined, placing dissimilar metal inserts of substantially the same size as said apertures in said apertures, placing a silver brazing alloy above and below said inserts, placing dissimilar metal material above and below said aluminum to form a sandwich structure, then heating said sandwich structure until said brazing alloy melts, then cooling said structure to form the desired bond between said dissimilar metal and said aluminum.

6. A joint between dissimilar metal and aluminum comprising an aluminum member and a pair of dissimilar metal members in bonded relation, said bond comprising a silver brazing alloy bonding said dissimilar metal members through an aperture in said aluminum and an alloy of said silver braze and said aluminum.

7. A joint as claimed in claim 6 in which said dissimilar metal has indentations extending into said aperture.

8. A joint between dissimilar metal and aluminum comprising an aluminum member and a pair of dissimilar metal members above and below said aluminum in bonded relation, said bond comprising a silver brazing alloy bonding said dissimilar metal members to a metal insert of the same dissimilar metal in an aperture in said aluminum and an alloy of said silver braze and said aluminum.

References Cited by the Examiner

UNITED STATES PATENTS

| | | | |
|---|---|---|---|
| 793,958 | 7/1905 | Richardson | 29—502 X |
| 1,956,233 | 4/1934 | Braun | 29—502 X |
| 2,319,455 | 5/1943 | Hardman et al. | |
| 3,095,951 | 7/1963 | Rood et al. | 189—36 |
| 3,119,418 | 1/1964 | Rayniak | 29—472.3 X |
| 3,141,949 | 7/1964 | Lovell | 29—502 X |
| 3,175,893 | 3/1965 | Meretsky | 29—470.1 X |

JOHN F. CAMPBELL, *Primary Examiner.*